United States Patent [19]

Kakizaki et al.

[11] Patent Number: 5,546,644
[45] Date of Patent: Aug. 20, 1996

[54] METHOD OF MAKING AN ACCELERATION SENSOR

[75] Inventors: Shinobu Kakizaki; Kimihisa Kasajima, both of Atsugi, Japan

[73] Assignee: Atsugi Unisia Corporation, Japan

[21] Appl. No.: 428,680

[22] Filed: Apr. 25, 1995

Related U.S. Application Data

[62] Division of Ser. No. 991,434, Dec. 16, 1992.

[30] Foreign Application Priority Data

Dec. 17, 1991 [JP] Japan .................................. 3-332393

[51] Int. Cl.⁶ ............................................... H01L 41/22
[52] U.S. Cl. .......................... 29/25.35; 29/25.42; 73/493
[58] Field of Search ............................... 29/25.35, 25.42, 29/854–856; 73/493, 516 R, 517 R, 517 A, 517 AV, 517 B

[56] References Cited

U.S. PATENT DOCUMENTS

| | | | |
|---|---|---|---|
| 4,700,973 | 10/1987 | Gademann et al. | 73/516 R X |
| 4,829,822 | 5/1989 | Imai et al. | 73/516 R |
| 5,233,873 | 8/1993 | Mozgowiec et al. | 73/493 X |
| 5,239,871 | 8/1993 | Reidmeister et al. | 73/517 R |
| 5,335,544 | 9/1994 | Wagner et al. | 73/517 R |

FOREIGN PATENT DOCUMENTS

| | | |
|---|---|---|
| 3920645 | 1/1991 | Germany . |
| 61187463 | 11/1986 | Japan . |
| 2033584 | 5/1980 | United Kingdom . |
| 2084330 | 4/1982 | United Kingdom . |

Primary Examiner—Carl E. Hall
Attorney, Agent, or Firm—Ronald P. Kananen

[57] ABSTRACT

A semiconductor type acceleration sensor comprises a flexible printed circuit board on which a semiconductor type detector chip section is mounted. The detector chip is formed with openings therethrough overlapping an opening formed in a rear-side base plate of the flexible printed circuit board such that the detector chip section is supported only by a bridge portion. In case of excess input in an acceleration direction, elastic deformation of the bridge portion and a bending portion of the flexible printed circuit board provide absorption of the excess input for protecting the detector chip section.

9 Claims, 5 Drawing Sheets

METHOD OF MAKING AN ACCELERATION SENSOR

This application is a division of application Ser. No. 07/991,434, filed Dec. 16, 1992.

BACKGROUND OF THE INVENTION

1. Field of The Invention

The present invention relates generally to an acceleration sensor for automotive vehicles. Particularly, the invention relates to a semiconductor type acceleration sensor, a detector chip of which may be protected from excess input in an acceleration direction.

2. Description of The Prior Art

Semiconductor type acceleration sensors are well known in the art and have various applications in the automotive field including suspension control, air bag system control, and the like.

Referring to FIG. 8, a detector 55 chip of such semiconductor type acceleration sensors is generally manufactured by LSI techniques on a silicon substrate 51. As seen in the drawing, the detector chip 55 is formed with a heavy bob section (i.e. a pendulum section) 52 of a cantilever shape by etching processing, or the like. Also, a strain gauge section 53 comprising a piezo resistance element, for example, is formed on a root portion of the heavy bob section 52, and at the same time, a signal processing circuit 54, for example, an amplifier circuit and so forth, is assembled on the silicon substrate 51 on which the heavy bob portion has been formed. Thereby, a detector chip 55 capable of being a principle component of an acceleration sensor may be formed with a convenient, single-chip construction.

According to the above-described construction, an electric signal output is obtained based on a variation of strain produced in the strain gauge portion 53 when acceleration is applied to the heavy bob section 52.

Referring now to FIG. 9, such a detector chip 55 as described above, is sealed in a casing 57 filled with insulating silicone oil 56 or the like to comprise a detection unit 58 of an acceleration sensor. As seen in FIGS. 10 and 11 the detection unit 58 is mounted on a substrate 60 with processing circuits 59 and the substrate 60 is incorporated into a housing 61. A sealing agent 62 fills a rear side of the housing 61 and a connector 68 is further provided.

In the above-described construction, silicon oil 56 is provided inside the casing 57 so as to provide a damping force, in a case where an excess acceleration is applied to the detect chip 55, for preventing weakening and/or deformation of a root portion of the heavy bob section 52.

The silicon oil 56 provides such damping characteristics according to its viscous resistance; however, the viscosity of the silicon oil 56 is largely varied according to temperature. Therefore a detection sensitivity of the detector chip 55 is correspondingly varied and the consistency and accuracy of the acceleration sensor is degraded.

In addition, aside from the problem of viscosity variation of the silicon oil 56, the presence of a damping fluid in the casing 57 of the detection unit 58 reduces the detection sensitivity of the detector chip 55 because an absolute displacement of the heavy bob 52 is suppressed by the viscous resistance of the silicon oil 56, or other damping fluid. This requires that the sensitivity and stability, particularly of an amplifier circuit and filter circuit as well as other signal processing circuits associated with the acceleration sensor, be substantially higher. Thus the cost and complexity of the entire sensor is increased.

SUMMARY OF THE INVENTION

It is therefore a principal object of the present invention to overcome the drawbacks of the prior art.

It is a further object of the present invention to provide a semiconductor type acceleration sensor in which a detector chip thereof is suitably protected from excess input and damping of movement wherein a movable portion of the detector chip is effected in a consistent non-temperature dependent manner without the use of damping fluid.

In order to accomplish the aforementioned and other objects, an acceleration sensor is provided, comprising: an enclosed housing portion; semiconductor type acceleration detecting means, the acceleration detecting means being formed on a silicon substrate and including thereon a substantially heavy bob section on at least one end thereof supported so as to be displacable in at least one direction according to an input acceleration, the acceleration detecting means outputting a signal representative of a degree of displacement of a the bob section, the acceleration detection means being mounted in the enclosed housing portion; signal processing means for processing an output from the acceleration detecting means; elastic support means elastically supporting at least the acceleration detecting means in an acceleration acting direction such that deformation of the elastic support means is detected in relation to the enclosed housing under a given degree of acceleration.

In addition, according to another aspect of the present invention, an acceleration sensor is provided comprising: a casing; upper and lower plates arranged one above the other within the casing the upper plate including an opening formed therethrough; A flexible substrate arranged inside the casing such that portions of the flexible substrate are adhered to upper surfaces of both the upper plate and the lower plate and so as to cover the opening in the upper plate; acceleration detection means mounted on the flexible substrate upper plate, at a position over the opening in the upper plate the acceleration detection means outputting a signal indicative of a degree of detected acceleration; signal processing means mounted on the flexible substrate and associated with the acceleration detection means; terminal portions attached to the flexible substrate and connected to the acceleration detection means and the signal processing means with a connector portion located outside of the casing; and sealing means enclosing the flexible substrate, the signal processing means, the detection means, the upper and lower plates and the terminal portions within the casing.

According to a further aspect of the invention, an alternative embodiment of an acceleration sensor is provided, comprising: a housing; a rigid substrate mounted within the housing; acceleration detection means mounted on the rigid substrate; signal processing means further mounted on the rigid substrate and outputting a signal representative of a degree of acceleration detected by the acceleration detection means; mounting spacers provided at each corner of the rigid substrate and formed of an elastic material, the mounting spacers elastically supporting at least the acceleration detecting means in an acceleration acting direction such that the mounting spacers are subject to elastic deformation in relation to the enclosed housing under a given degree of acceleration; connection means allowing at least the signal processing means to be connected to external apparatus; and a bottom portion enclosing the rigid substrate, the acceleration detection means, the signal processing means, and the mounting spacers within the housing.

According to yet another aspect of the present invention, a method of assembling an acceleration sensor is provided, comprising the steps of: a) forming an elongate flexible substrate: b) mounting an acceleration detection means on the flexible substrate; c) mounting signal processing means on the flexible substrate; d) mounting connecting terminals to the flexible substrate: e) adhering opposing portions of the flexible substrate respective plates one of the plates having an opening defined therethrough, a portion of the flexible substrate mounting the acceleration detection means being positioned over the opening formed in the one of the plates: f) folding the flexible substrate along a central folding portion; g) inserting the plates and the folded flexible substrate into a casing having an open bottom portion such that the one plate is inserted topmost and the acceleration detecting means mounted on the flexible substrate is facing in an acceleration direction, the shape of the plates conforming to the circumferential shape of the casing and the other plate being inset at the bottom of the open portion of the casing: h) installing connecting means connecting the acceleration detecting means with an output external to the casing; and i) sealing the casing via a sealing agent.

Finally, according to the invention another method of assembling an acceleration sensor is provided, comprising the steps of: a) mounting acceleration detection means on a rigid substrate: b) mounting signal processing means on the rigid substrate; c) providing mounting spacers formed of an elastic material at each corner of the rigid substrate, such that the mounting spacers elastically support at least the acceleration detecting means in an acceleration acting direction; d) installing connection means allowing at least the signal processing means to be connected to external apparatus; and e) attaching a bottom portion so as to enclose the rigid substrate, the acceleration detection means, the signal processing means, and the mounting spacers within the housing.

DESCRIPTION OF THE PREFERRED EMBODIMENT

Figure 1:
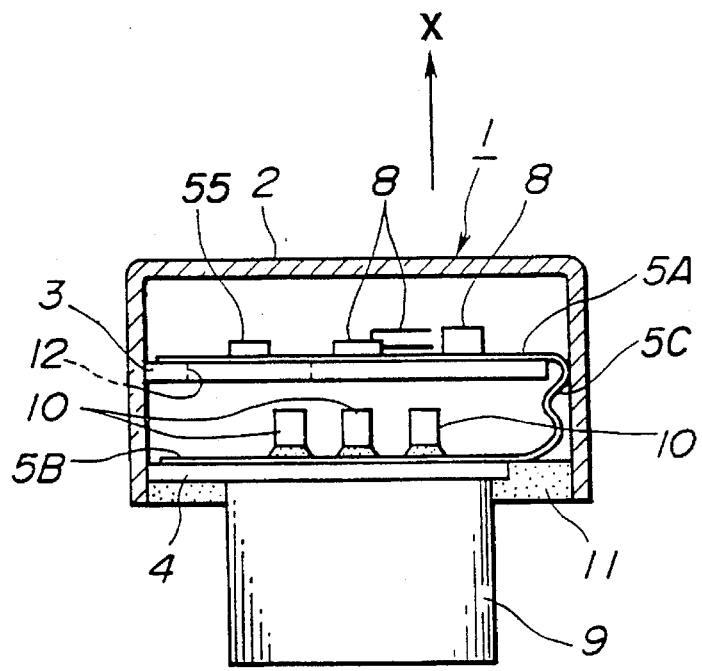
FIG. 1 shows a cross-sectional view of a first embodiment of an acceleration sensor according to the invention.
Figure 4:
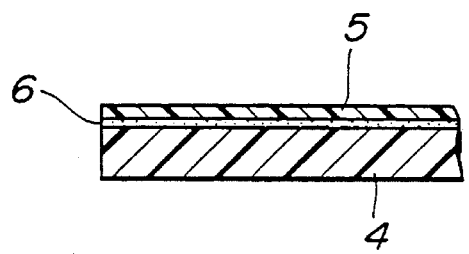
FIG. 4 is a cross-sectional view taken along line a—a of FIG. 3.

Referring now to the drawings, particularly to FIGS. 1, an acceleration sensor according to the invention is shown. As seen in the drawing, the sensor 1 comprises a rectangular casing 2 containing therein an upper plate 3 and a lower plate 4 made of synthetic resin, for example, and arranged one above the other. A flexible printed circuit substrate 5 is arranged inside the casing 2 such that portions of the flexible printed circuit substrate 5 are adhered to upper surfaces of both the upper plate 3 and the lower plate 4 via a bonding agent 6, as shown in FIG. 4. On the upper surface of the upper portion 5A of the flexible printed circuit substrate 5, a detector chip SS and associated signal processing circuits 8, 8 are mounted while, on the upper surface of the lower portion 5B of the flexible printed circuit substrate 5, terminal portions 10 of a connector 9 are attached by soldering, or the like. The upper portion 5A of flexible printed circuit is joined to the lower portion 5B through an elongated folded central portion 5C. Further, the under the lower plate 4, the base portion of the casing 2 is entirely closed by a sealing agent, 11, thus the components of the acceleration detector 1 are completely enclosed within the casing 2.

The structure of the detector chip is well known and has been described above with reference to FIG. 7; therefore such description will be omitted for brevity. When referring to the components of the detector chip SS the same reference numerals will be cited for clarity of description.

Figure 2:
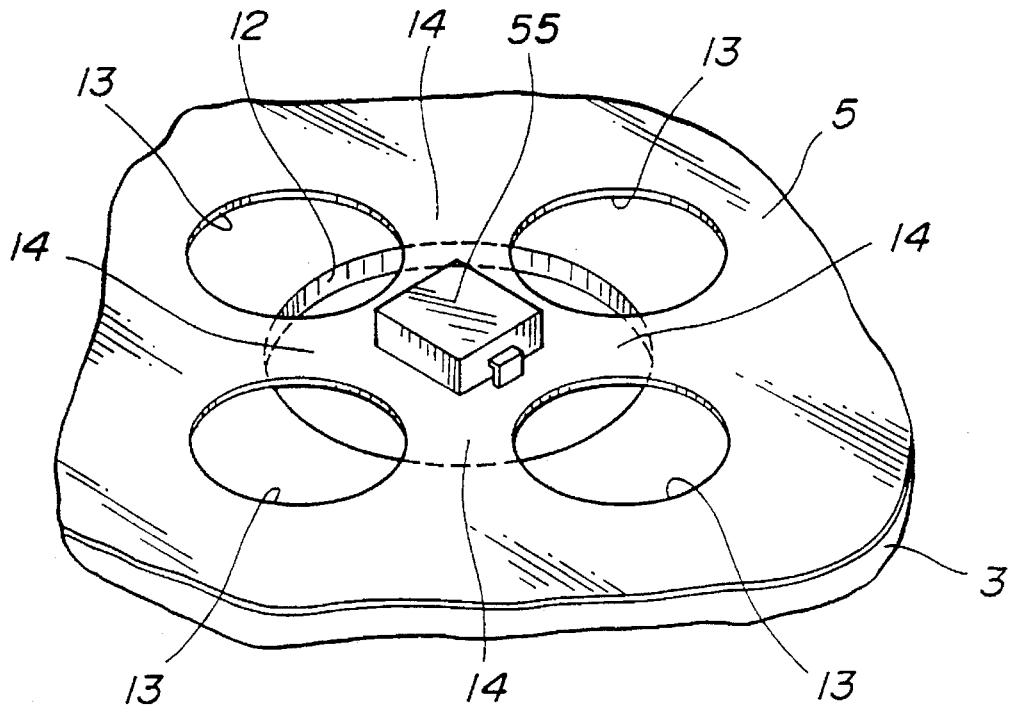
FIG. 2 shows an enlarged perspective view of the main features of FIG. 1.

Referring to FIG. 2, the detector chip SS, a circular hole 12, wider in area than the detector chip SS is formed through the upper plate 3 under the position of the detector chip SS. Thus, in the area of the detector chip SS, the chip is supported only by the flexible printed circuit substrate 5 with no underlying plate. In addition, a plurality of smaller circular holes 13 are formed through the flexible printed circuit substrate 5 so as to surround the detector chip SS. The smaller holes 13 are formed such that a portion of their area overlaps a portion of the large hole 12 formed in the upper plate 3. Thus, the detector chip SS is suspended on an elastic bridge portion 14 which defined by the smaller holes 13 and the portions of the flexible printed circuit substrate 5 which overhangs the large circular hole 12. Thus an acceleration buffering construction is created wherein excess acceleration input to the detector chip is absorbed by deformation of the elastic bridge portion 14.

According to the above embodiment a plurality of holes (i.e. four) are provided. However, the advantageous effects of the invention may be realized by providing only the large hole 12 covered by the flexible printed circuit substrate 5 only, for mounting the detect chip SS thereon. The number and size of the surrounding smaller holes 13 may be determined according to a degree of elastic deformability to be provided for the bridge portion 14. A greater degree of elasticity providing a higher buffering effect for the detector chip SS.

Figure 3:
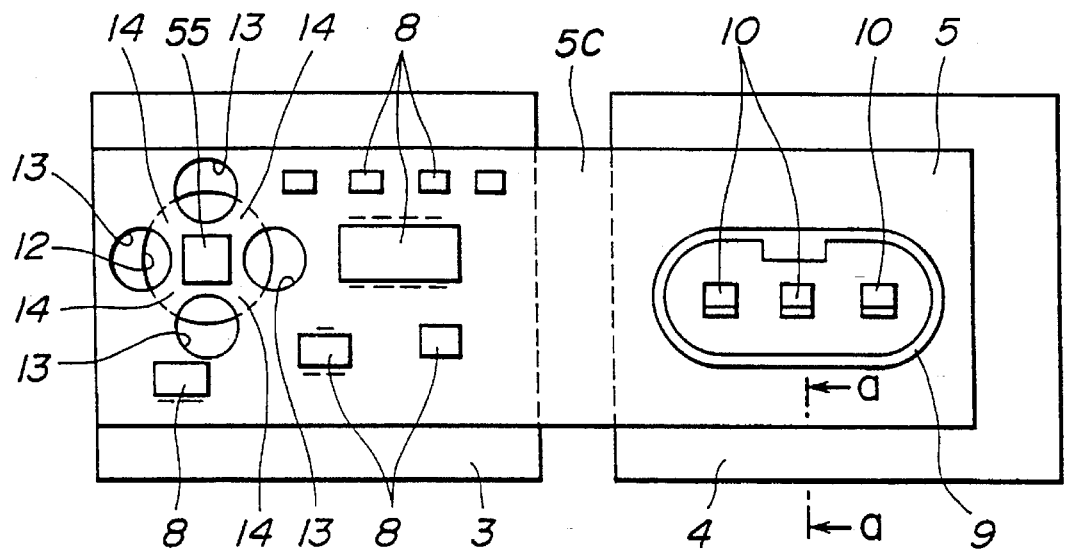
FIG. 3 is a plan view of a printed circuit board utilized in the acceleration sensor of the invention.

Hereinbelow, an assembly procedure for an acceleration sensor according to the invention will be described in detail with reference to FIGS. 3 and 4.

Figure 8:
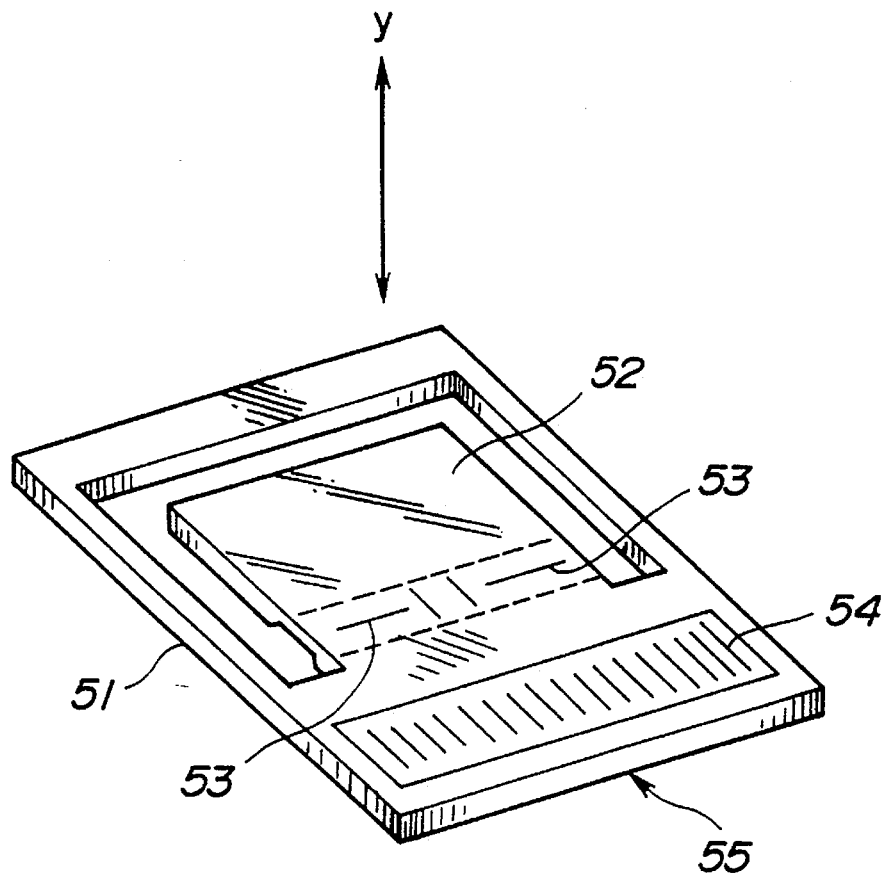
FIG. 8 is an enlarged perspective view of the essentials of a conventional detector chip section of a semiconductor type acceleration sensor.
Figure 9:
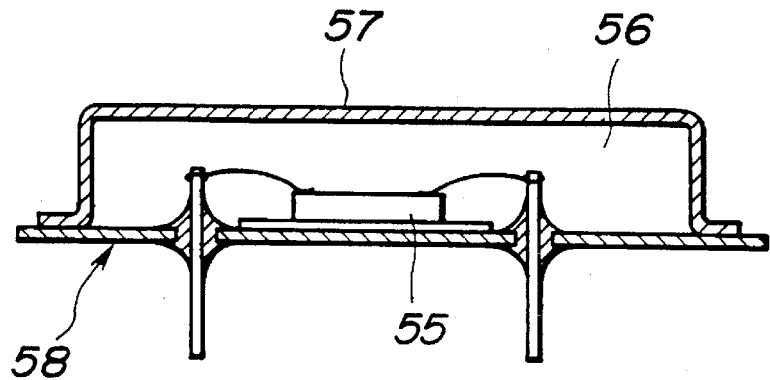
FIG. 9 is a cross-sectional view of a conventional detection unit for detecting acceleration formed using the detector chip of FIG. 8 as a central component.
Figure 10:
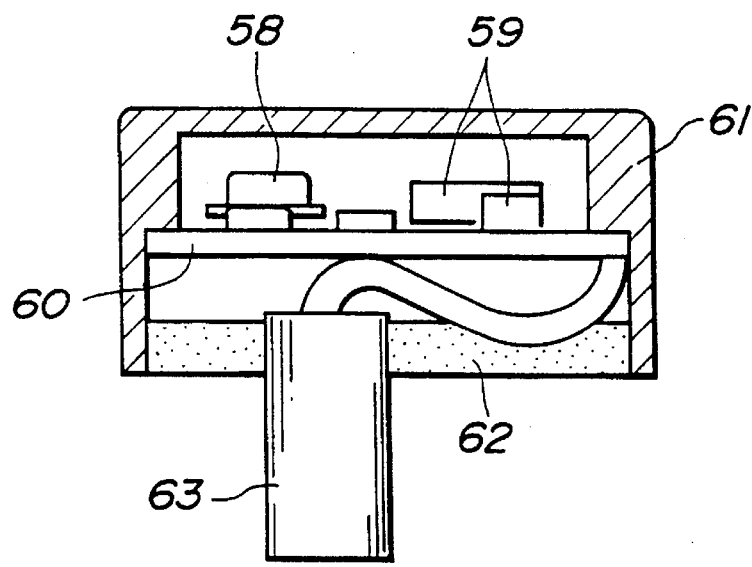
FIG. 10 is a cross-sectional view of a conventional acceleration sensor including the detector unit of FIG. 9.
Figure 11:
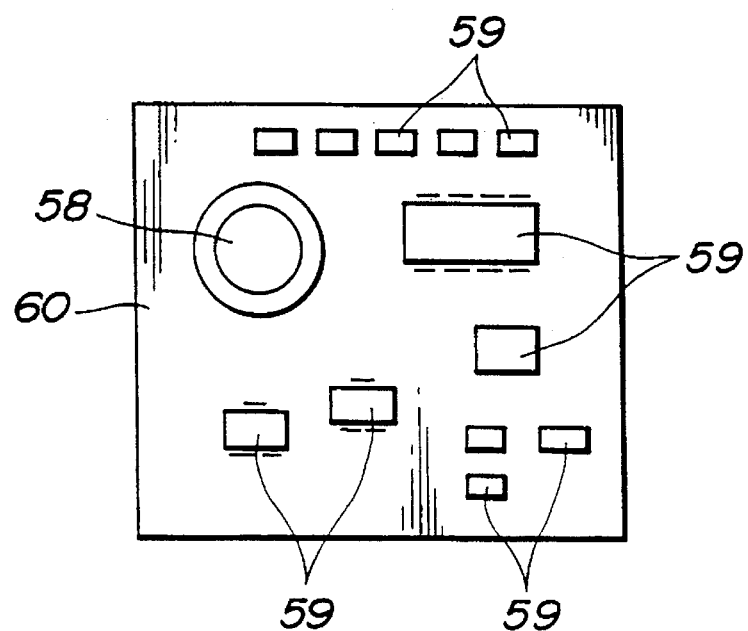
FIG. 11 is a plan view of a printed circuit board utilized in the conventional acceleration sensor of FIG. 10.

First, referring to FIG. 8, the elongated flexible printed circuit substrate 5 is formed and provided with the necessary components such as the detector chip SS, the signal processing circuits 8, 8, the small holes 13, and the terminals 10 of the connector 9 in advance. Next, respective portions 5A and 5B of the flexible printed circuit substrate 5 are adhered to the upper and lower plates 3 and 4 via the bonding agent 6, as best seen in FIG. 4.

After the flexible printed circuit substrate 5 affixed to the plates 3 and 4, the flexible printed circuit substrate 5 is folded along an elongate central folded portion SC and inserted into the casing 2 through the open bottom portion such that the plate 3 is inserted topmost, the shape of the plate 3 conforming to the circumferential shape of the casing 2, and the plate 4 is inset at the bottom of the open portion of the casing 2 after which it is sealed therein by the sealing agent 11. It will be noted from FIG. 1 and from the above description that the folded portion SC, for which a small space is allowed on one side of the plate 3, further acts as an elastic support for the upper plate and thus provides additional buffering against excess acceleration input.

Thus, according to the above described structure, in a state where the acceleration sensor 1 is installed in a vehicle, for example, if an excess input in the acceleration detecting direction is applied, the folded portion SC is deformed to provide a buffering effect essentially for the entire upper plate 3. However, since the essential element of the acceleration sensor 1, that is, the detector chip SS, is mounted on the bridge portion 14 over the hole 12 of the upper plate 3, the bridge portion 14 is similarly elastically deformed in the acceleration input direction to absorb an excess acceleration force applied to the detector chip and thus prevent deformation or damage at the root of the heavy bob portion 52 of the detector chip SS.

Hereinbelow, a second embodiment of the invention will be described in detail with reference to FIGS. 5–7.

Figure 5:
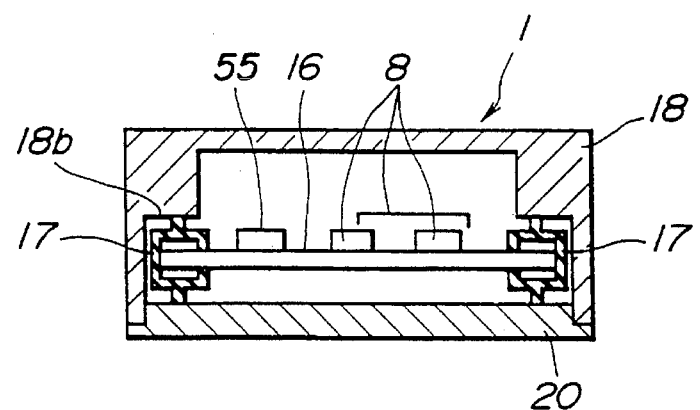
FIG. 5 is a cross-sectional view of a second embodiment of an acceleration sensor according to the invention.

According to this embodiment, as best seen in FIG. 5, the detector chip SS, the signal processing circuits 8, 8 and the like are mounted on a conventional, hard type printed circuit board 16 which is then elastically supported in a housing 18 via a mount spacer 17 formed of an elastic material such as rubber, or the like.

Figure 6:
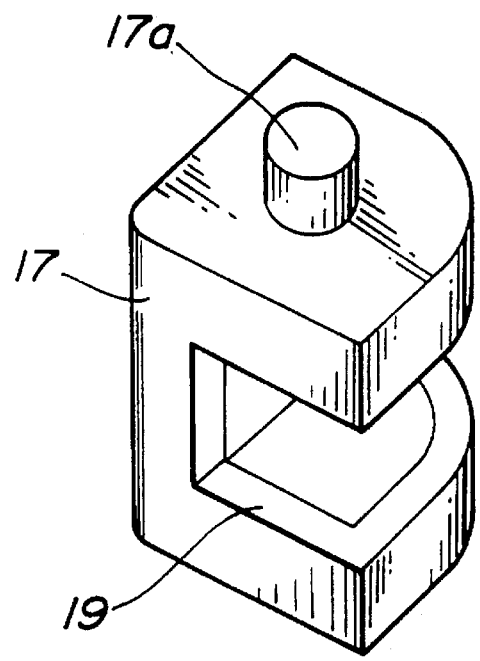
FIG. 6 is an enlarged perspective view of a mount spacer utilized in the acceleration sensor of FIG. 5.
Figure 7:
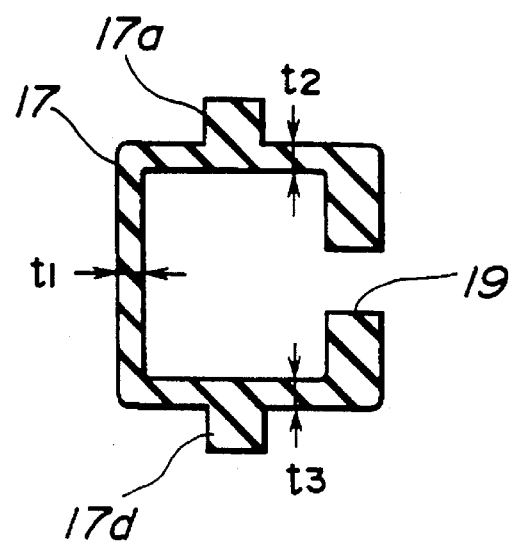
FIG. 7 is a vertical cross-sectional view of the mount spacer of FIG. 6.

More specifically, referring to FIGS. 6 and 7, the mount spacer 17 has a hollow configuration with an engaging notch 19. Mount spacers 17 are provided at all four corners of the printed circuit board 16 and installed therewith into a rectangular shaped casing 18 such that the printed circuit board 16 is supported by the mount spacers 17, upper and lower positioning nodes 17a of the mount spacers 17 respectively contacting a stepped surface 18b of the casing 18 and the upper surface of a bottom portion 20 which closes the bottom of the casing 18 after the printed circuit board 16 and mount spacers 17 have been installed.

According to the above-described construction, the mount spacer of the second embodiment provides a buffering effect in supporting the detector chip of the acceleration sensor 1 in the same way as the elastic bridge of the first embodiment. In addition, the mount spacer of the second embodiment provides elastic support for the components of the acceleration sensor 1 not only in the direction of input acceleration, but also in transverse, or orthogonal directions. Also, it will be noted, with reference to FIG. 7 that, by suitable selection of the widths t1, t2, and t3 of the mount spacer 17, and selection of appropriately hard or resilient materials for making the mount spacer 17, various elastic and resilient properties are available which may be utilized for providing optimum characteristics for the intended application of the acceleration sensor 1.

The present invention may be also be applied to a capacitance type acceleration sensor for determining acceleration by detecting variation of capacitance of a capacitor due to displacement of a heavy bob arranged at one side pole of the capacitor.

Thus, according to the present invention as herein described, a detector chip may be elastically mounted to suitable protect the chip from damage and/or deformation due to an excess input of an acceleration force in an input direction. Further, detecting accuracy is improved since a damping fluid such as silicon oil is not required. In addition, variation of detection accuracy due to an ambient temperature is avoided.

It will also be noted that, since displacement of the heavy bob portion of the detector chip is not suppressed due to the presence of a damping fluid, it is unnecessary to use signal processing circuits of inordinately high sensitivity. Nor are hermetic sealing techniques for retaining fluid required for manufacturing the sensor of the invention. Thus reduction of costs for the acceleration sensor as a whole can be realized.

While the present invention has been disclosed in terms of the preferred embodiment in order to facilitate better understanding thereof, it should be appreciated that the invention can be embodied in various ways without departing from the principle of the invention. Therefore, the invention should be understood to include all possible embodiments and modification to the shown embodiments which can be embodied without departing from the principle of the invention as see forth in the appended claims.

What is claimed is:

1. A method of assembling an acceleration sensor, comprising:
    a) forming an elongate flexible substrate;
    b) mounting an acceleration detection means on said flexible substrate so as to be active to detect acceleration applied to said sensor;
    c) mounting signal processing means on said flexible substrate in connection with said acceration detection means so as to receive an output thereof;
    d) mounting connecting terminals to said flexible substrate in connection with said signal processing means;
    e) adhering opposing portions of said flexible substrate to respective plates, one of said plates having an opening defined therethrough, a portion of said flexible substrate mounting said acceleration detection means being positioned over said opening;
    f) folding said flexible substrate along a central folding portion;
    g) inserting said plates and said folded flexible substrate into a casing having an open portion such that one plate is inserted topmost and said acceleration detecting means mounted on flexible substrate is facing in an acceleration direction, the shape of the plates conforming to the circumferential shape of the casing and the other plate being inset at the bottom of the open portion of the casing;
    h) installing connecting means connecting said acceleration detecting means with an output external to said casing; and
    i) sealing said casing via a sealing agent.

2. A method as set forth in claim 1, further including the step of forming an opening in said flexible substrate in the vicinity of said acceleration detection means such that, after said adhering step is carried out, a portion of said opening will overlap said opening of said one plate.

3. A method as set forth in claim 1, further including the step of forming a plurality of openings in said flexible substrate in the vicinity of said acceleration detection means such that a portion of said openings will overlap said opening of said one plate after said adhering step.

4. An method as set forth in claim 3, wherein said opening in said one plate is circular and said plurality of said openings in said flexible substrate are circular and smaller than said opening in said plate, said plurality of smaller openings being arranged symmetrically around said acceleration detection means.

5. A method as set forth in claim 1, wherein said acceleration detection means comprises a semiconductor acceleration sensor formed on a silicon substrate, said semiconductor acceleration sensor including a mass formed on a cantilever and having a weight and positioning determined such that said mass is displacable in at least said acceleration direction, and a strain gauge positioned so as to be responsive to movement of said mass, said strain gauge comprising a piezo resistance element, said acceleration detection means being assembled on said substrate.

6. A method as set forth in claim 1, wherein said signal processing means includes at least an amplifier circuit and a filter circuit.

7. A method as set forth in claim 1, wherein said acceleration detection means is a capacitance acceleration sensor detecting variation of capacitance of a capacitor due to displacement of a mass arranged at one side of the capacitor.

8. A method as set forth in claim 1, wherein said acceleration detection means is mounted on said flexible substrate at a location remote from said connection means such that, after said folding step, said acceleration detection means is adhered over said one, topmost place and said connection means is adhered to said other plate positioned below said topmost plate.

9. A method as set forth in claim 1, wherein a size of at least said one plate is selected so as to allow said folded portion of said flexible substrate to resiliently support said one plate relative to said other plate.

* * * * *